Feb. 12, 1963 W. B. HEATON 3,077,103
CHROMATOGRAPHIC METHOD AND APPARATUS
Filed Feb. 10, 1958 3 Sheets-Sheet 2
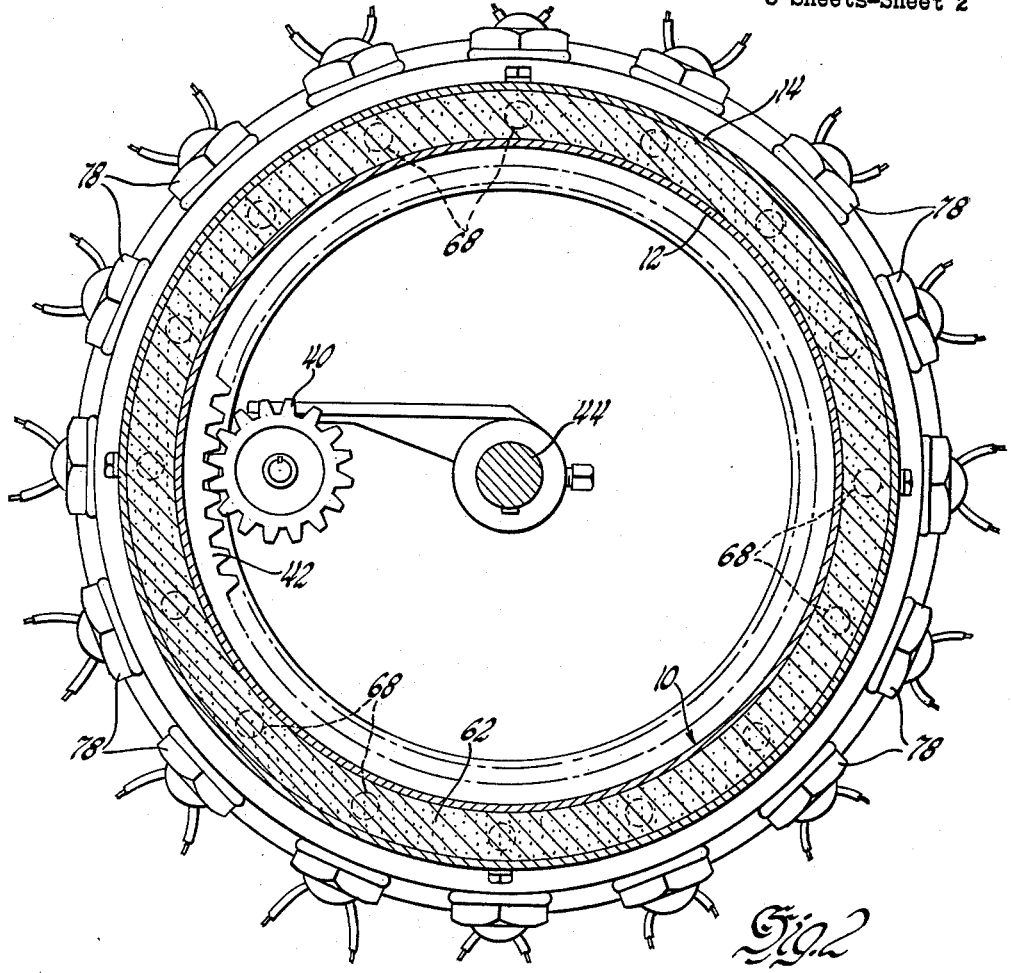
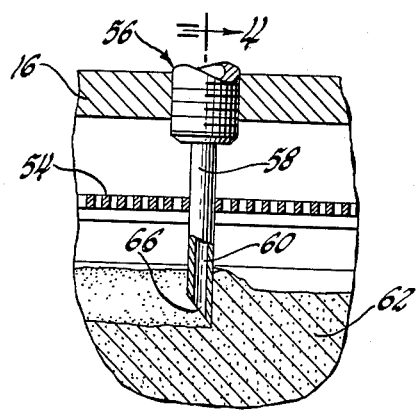
INVENTOR.
William B. Heaton
BY
G. N. Shampo
ATTORNEY INVENTOR.
William B. Heaton
BY
G. M. Shampo
ATTORNEY

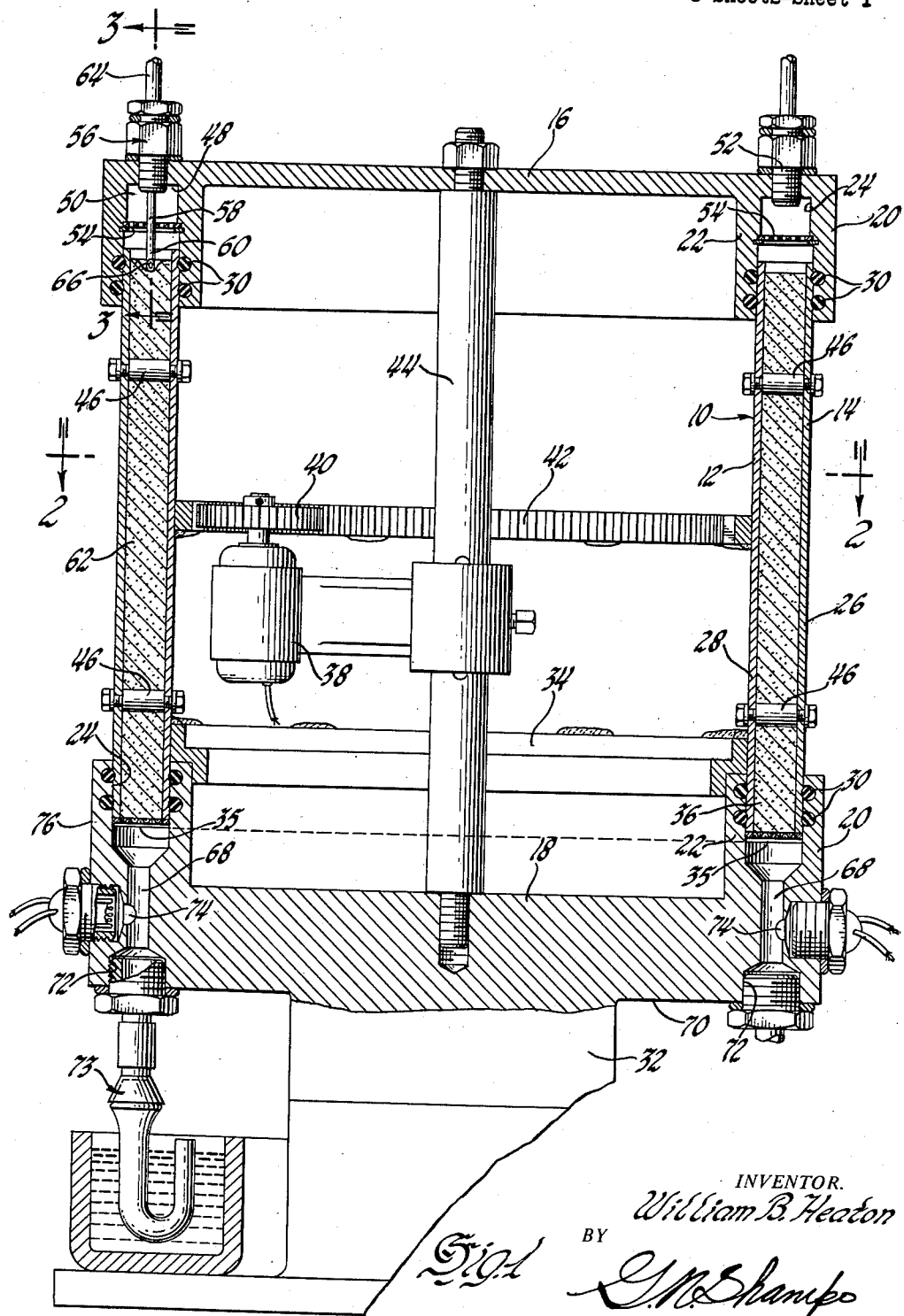

United States Patent Office 3,077,103
Patented Feb. 12, 1963

3,077,103
CHROMATOGRAPHIC METHOD AND APPARATUS
William B. Heaton, Birmingham, Mich., assignor to General Motors Corporation, Detroit, Mich., a corporation of Delaware
Filed Feb. 10, 1958, Ser. No. 714,348
5 Claims. (Cl. 73—23)

This invention relates to a method and apparatus for the separation of gases or liquids, such as can be used for laboratory analysis, although more particularly useful for analysis and monitoring of industrial process streams.

Conventionally, chromatographic separations are performed in a generally cylindrical tubular column containing a stationary phase in which a sample mixture is placed. A suitable solvent or carrier, which functions as a movable phase, is subsequently introduced into the column to partition the various substances in the sample mixture and elute them from the column. The conventional process of introducing a sample mixture into the tubular column and subsequently eluting it is essentially a sequential process, and it is therefore inherently discontinuous.

It is an object of the present invention to provide a method and apparatus for obtaining a continuous chromatographic separation between individual components of a sample mixture. The present invention further provides a more useful method of chromatographic analysis than was heretofore possible with sequential discontinuous methods. A continuous method of chromatographic analysis is provided in the present invention by means of an annular chromatographic column which is continuously rotated while the sample mixture is simultaneously introduced into the top of the column from a stationary injecting means.

Other objects, features and advantages of the present invention will become more apparent from the following description of preferred embodiments thereof and from the drawings, in which:

FIGURE 1 is a vertical sectional view of an annular chromatographic column-type apparatus embodying the present invention;

FIGURE 2 is a sectional view along the line 2—2 of FIGURE 1;

FIGURE 3 is a sectional view along the line 3—3 of FIGURE 1;

Figure 4:
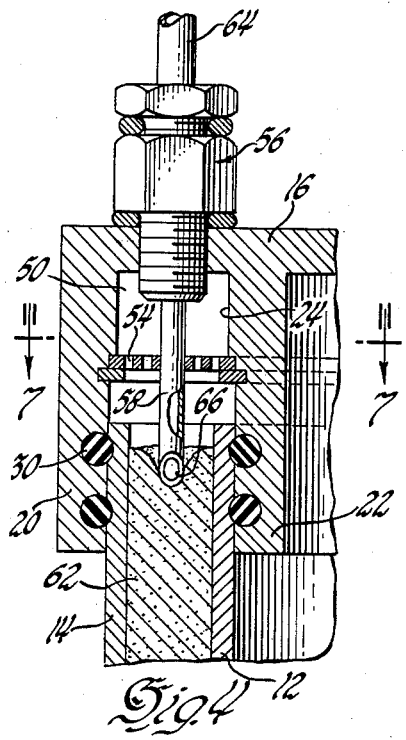
FIGURE 4 is a sectional view along the line 4—4 of FIGURE 3.

As shown in FIGURE 1, an annular chromatographic column 10, formed from concentric coaxial cylindrical members 12 and 14, is positioned between two circular end pieces 16 and 18. Preferably the column 10 is positioned with its longitudinal axis in a vertical plane wherein the end pieces 16 and 18, respectively, form upper and lower closures for corresponding open ends of the column. Each circular end piece has concentric circumferential axially extending walls 20 and 22 on the surface thereof adjacent to the annular column. The spaced walls 20 and 22 form an annular recess or groove 24 in which the column is disposed. The walls 20 and 22 forming the annular recess 24 are spaced so as to be in close-fitting relationship with the outer surfaces 26 and 28 of the annular column 10. Annular resilient O-ring sealing members 30 within the annular recess 24 of each end piece circumferentially engage the outer surfaces 26 and 28 of the column.

The lower end piece 18 is provided with an integral base member 32 which serves to support the apparatus. The column rests on the lower end piece 18, being supported thereon by means of a support ring or collar 34 on the inner surface 28 of the column. The support ring 34 supports the column 10, spacing the lower end 36 of the column from the end walls 35 of the recess 24, thereby inhibiting binding of the column within the annular recess of the stationary lower end piece 18.

The column, not being rigidly affixed to the end pieces 16 and 18, is rotatably movable therebetween. Rotational movement of the column 10 is provided by means of a motor 38 and connected spur gear 40 which meshes with a ring gear 42 on the inner circumference 28 of the column. The motor 38 and spur gear 40 are suitably supported on an axial upright member 44 projecting up from the lower end piece 18. The inner and outer cylindrical members 12 and 14 forming the annular column 10 are rigidly connected by suitable bolt members 46 so that movement of the inner cylindrical member 12 will induce a corresponding movement of the outer member 14.

Figure 7:
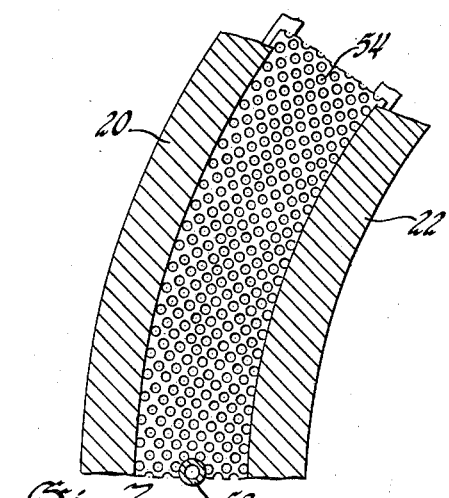
FIGURE 7 is a sectional view along the line 7—7 of FIGURE 4.

The upper circular end piece 16 is immovably supported over the top of the column by the axial upright member 44. The support member 44 spaces the end wall 48 of the annular recess 24 in the end piece 16 from the adjacent top of the column. An annular chamber 50 is thus provided at the top of the column forming a manifold in the upper end piece. A carrier gas is introduced into the manifold from a suitable source (not shown) through the inlet 52. Equal distribution of the carrier gas throughout the annular manifold 50 above the column 10 is effected by means of a suitable screen 54, shown more clearly in FIGURE 7, through which the carrier gas must diffuse.

The sample which is to be partitioned is directly introduced from an exterior source (not shown) into the column 10 through an injecting device 56 in the stationary upper end piece 16. A capillary tube 58 depends downwardly through the diffusion screen 54 in the manifold, the end 60 of the tube 58 being adjacent the top of the packing 62 in the column 10.

When fractionating liquid samples, for example, the injecting means shown in FIGURES 1, 3 and 4 is especially satisfactory. A capillary tube 58, which is suitably secured to an exterior supply tube 64, has an end surface 66 which is at an acute angle with the longitudinal axis of the tube. The tube 58 depends through the diffusion screen 54 and into contact with the packing 62 of the column, as shown in the figures. In this manner a continuous even flow of a liquid sample can be introduced directly into the packing. As the column is rotated, the end 60 of the tube will displace the packing in its path, thereby effecting a polwing action as it moves therealong.

Figure 5:
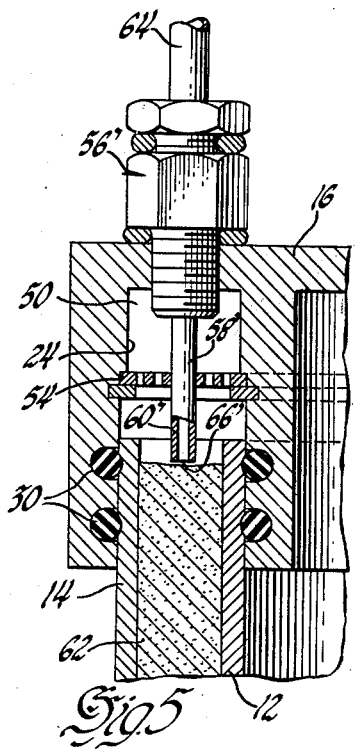
FIGURE 5 is a sectional view of a modification of the apparatus shown in FIGURE 4.

Although when analyzing liquid samples it is desirable to employ the above-mentioned injecting device, gaseous samples can more advantageously be analyzed when using a capillary tube 58′, such as that shown in FIGURE 5. This latter modification of the injector has a capillary tube 58′ which has its end surface 66′ at substantially right angles to its longitudinal axis. The end 60′ of the tube 58′ is placed closely adjacent but not in contact with the packing 62 of the column. The gas emitted from the capillary tube 58′ thus evenly diffuses directly into closely adjacent packing 62.

Figure 6:
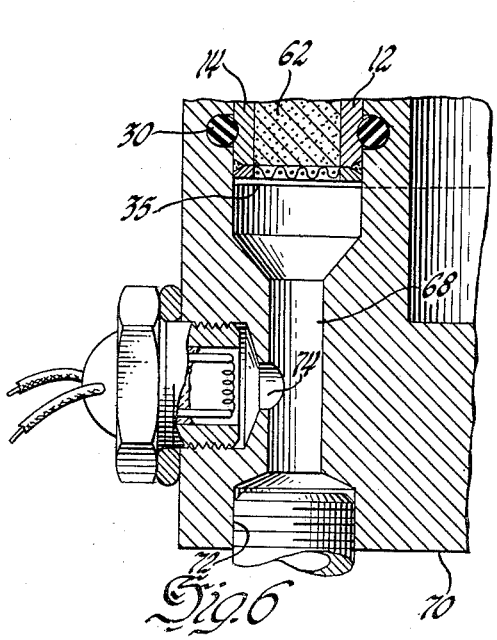
FIGURE 6 is an enlarged fragmentary sectional view showing a column elution outlet detector device illustrated in FIGURE 1.

A plurality of circumferentially spaced vertical collection passages 68, shown in FIGURES 1, 2 and 6, communicate the lower end 36 of the column 10 with the lower surface 70 of the stationary lower end piece 18. The lower extremities of the collection passages can be adapted with internal threads 72 to facilitate attachment of collection devices 73, such as shown in FIGURE 1, or attachment of suitable plugs to close those passages which are not being used.

Lateral passages 74, communicating the radial surface 76 of the lower end piece 18 with the collection passages 68, can be used to facilitate detection of separated materials. A thermal conductivity cell, shown more clearly in FIGURE 6 mounted in these lateral passages, can be used to rapidly and automatically detect the presence of each fraction. Such detectors are especially useful when the apparatus is used to monitor process streams, furnish continuous analytical data, etc.

A description of the operation of the apparatus will serve to illustrate the method of the present invention. For a continuous method of partitioning the column is rotated within the stationary end pieces as the carrier gas and sample mixture are simultaneously introduced. The carrier gas which is introduced through the inlet 52, circulates through the manifold 50, passes through the diffusion screen 54 and then down through the packing or chromatographic bed 62. Meanwhile, the sample mixture is simultaneously and continuously introduced directly into the chromatographic bed 62 through the capillary tube 58 in the injecting device 56.

The rate at which the various fractionations in the sample mixtures are eluted will determine the preferable speed at which the chromatographic column 10 should be rotated. It is advantageous that the sample mixture be completely eluted within one revolution of the chromatographic bed to utilize the apparatus most effectively. The bed is preferably rotated at such a speed that, as each fraction of the partitioned sample arrives at the lower end 36 of the column 10, it is aligned with one of the vertical collection passages 74 in the lower end piece or collection head 18. Many separations can be accomplished when the bed is rotated at a speed of one to ten revolutions per hour.

Although liquid samples are preferably directly introduced into the chromatographic bed 12 by means of the injecting device 56, shown in FIGURES 1, 3 and 4, highly volatile liquid samples can also be vaporized and continuously introduced in the gaseous state through the injecting device 56', shown in FIGURE 5. Further, as is well known in the art, a liquid sample can be continuously vaporized into a carrier gas stream and introduced directly into the packing in the vapor state through the injecting device 56'.

As in conventional methods, the particular carrier gas which is preferred can vary considerably in many applications. However, in most instances a gas which is relatively inert to the sample mixture is preferred. When employing a thermal conductivity cell as a detecting device in the collection head, the choice of a particular carrier gas is made so as to obtain maximum sensitivity by the detector. Since the thermal conductivity of average organic vapors is approximately one half of the conductivity of air, one can use clean dry compressed air or nitrogen as the carrier gas. If more sensitivity is desired, a carrier gas should be chosen which has a thermal conductivity higher than air in order to have a greater difference between the thermal conductivity of the carrier gas and the sample fraction. Since thermal conductivities are approximately inversely proportional to molecular weight or specific gravity, the lightest gases will provide maximum sensitivity. Therefore, hydrogen is theoretically the best carrier gas from a point of view of sensitivity. In practice, the flammability of hydrogen makes this gas generally unsuitable. The next lightest gas is helium which has approximately six times the thermal conductivity of air and due to its inertness it is especially suitable for general laboratory use. Should the fractions be burned as they are eluted, as is performed in flame detection, it is desirable to elute and fractionate the sample using oxygen as a carrier gas.

The carrier gas, as in conventional type chromatographic separations, is generally under a pressure of five to 50 pounds per square inch having a flow rate through the column of between about one milliliter per minute to approximately one liter per minute. The sample mixture can be introduced in amounts from .01 milliliter to 10 milliliters per minute and in some instances as high as 100 milliliters per minute should elution of the sample mixture take place especially rapidly.

The packing which will be employed will vary upon the nature of the sample mixture which is to be fractionated. Packings generally are active adsorbents having a particle size which will pass a 25 mesh screen. Solid active adsorbents such as activated charcoal, etc., are useful in many applications. Inert packings coated with a suitable absorbent liquid which comprises from about 5% to 50% by weight of packing have also been employed. Inert packings which can be used include diatomaceous earth, alumina, sand, glass spheres, glass wool, sodium chloride, polyethylene powder, metal spheres, etc. Liquid absorbents which are useful are substances, such as paraffin oil, silicone oil, phthalate esters or generally any liquid having such a low vapor pressure at the operating temperature employed that the liquid will not be eluted by the carrier gas.

Optional heaters (not shown) can be employed with the apparatus to heat a part or all of one vertical section of the column as it approaches completion of a fractionation cycle. In this manner low boiling point fractions which are not eluted within one revolution of the column at usual operating temperatures can be readily exhausted from the column. The temperature increase promotes a corresponding increase in the vapor pressure of the non-eluted fractions which can then be readily exhausted from the column by the carrier gas.

Although this invention is primarily intended for continuous analysis of gaseous or liquid streams, it is also useful for the discontinuous fractionation of intermittently injected sample mixtures. A liquid or gaseous sample mixture can be intermittently injected into the column much the same as in the continuous method described hereinbefore. In addition sample mixtures in the gaseous state can also be intermittently introduced into a stream or carrier gas which is passed through the injecting device 56 or 56'. Correspondingly, highly volatile liquid sample mixtures can be vaporized into a carrier gas stream much the same way as practiced in the sequential conventional chromatographic methods and preferably introduced into the column through the injecting device 56'.

Although this invention has been described in connection with certain specific examples thereof, it is understood that no limitation is intended thereby except as defined in the appended claims.

I claim:

1. A chromatographic apparatus comprising a chromatographic column which is annular in transverse section, a suitable packing in said column, a stationary circular manifold head having a surface thereof in circumferential contact with one end of said column forming an end wall therefor, an annular recess in said surface of said manifold head, a collection head having a surface thereof in circumferential contact with the opposite end of said column forming an end wall therefor, an annular recess in said surface of said collection head, a plurality of circumferential spaced outlets in said collection head for collecting partitioned materials eluted from said column, a thermal conductivity cell in said collection outlets for detecting the presence of partitioned materials, said ends of said column positioned within said recesses of said end pieces, said column axially rotatable within said recesses, a ring gear on the inner circumference of said column cooperating with a spur gear for inducing rotation of said column, a capillary tube in said stationary manifold head for injecting a sample mixture directly into said column, a manifold in said manifold head for distributing a carrier gas throughout the circumference of said annular column, and a diffusion screen in said manifold.

2. The apparatus described in claim 1 wherein the end of the capillary tube is at an acute angle with the longitudinal axis of the tube and is positioned so as to be in contact with the packing during the axial rotation of the column.

3. A process for the quantitative collection of a chromatographically separated fraction of a sample mixture containing a plurality of partitionable substances, said process comprising the steps of introducing said sample mixture at a point into one end of an annular chromatographic column having a chromatographic bed, introducing a movable phase into said end of said column, placing an end closure having a circumferential row of spaced apertures therein, said row registering with the opposite end of said column, passing said movable phase through said column so as to separate said partitionable substances into fractions which are sequentially eluted from said opposite end of said column, rotating said column relative to said closure so as to locate a fraction emerging from said bed adjacent an aperture in said closure, continuing to pass said movable phase through said column to elute said fraction from said column through said aperture and collecting the fraction which passes through said aperture.

4. A process for the continuous collection of a chromatographically separated fraction of a sample mixture containing a plurality of partitionable substances, said process comprising the continuous concurrent steps of introducing a sample mixture at a point into one end of an annular chromatographic column having a chromatographic bed, introducing a movable phase into said end of said column, placing an end closure having a circumferential row of spaced apertures therein, said row registering with the opposite end of said column, passing said movable phase through said column so as to separate said partitionable substances into fractions which are sequentially eluted from said opposite end of said column, rotating said column so as to locate a single fraction emerging from said bed adjacent an aperture in said end closure, continuing to pass said movable phase through said column to elute said fraction from said column through said aperture and collecting the fraction which passes through said aperture.

5. A process for the quantitative collection of a chromatographically separated fraction of a sample mixture containing a plurality of partitionable substances, said process comprising the steps of providing an annular chromatographic column having a chromatographic bed, introducing said sample mixture into one end of said column at a rate of about 0.1 milliliter to 100 milliliters per minute through a capillary tube which has its end closely adjacent said chromatographic bed, introducing a carrier gas into said end of said column, placing an end closure having a circumferential row of spaced apertures therein, said row registering with the opposite end of said column, passing said carrier gas through said column under a pressure of approximately 5 pounds per square inch to 50 pounds per square inch so as to separate said partitionable substances into fractions which are sequentially eluted from said opposite end of said column, rotating said column so as to locate a fraction emerging from the bed of said column adjacent one of said apertures in said end closure, continuing to pass said carrier gas through said column to elute said fraction from said column through said aperture and collecting the fraction which passes through said aperture.

References Cited in the file of this patent

UNITED STATES PATENTS

| | | |
|---|---|---|
| 2,294,214 | Seinfeld | Aug. 25, 1942 |
| 2,302,807 | Shoeld | Nov. 24, 1942 |
| 2,678,108 | Reid | May 11, 1954 |
| 2,751,033 | Miller | June 19, 1956 |
| 2,759,560 | Miller | Aug. 21, 1956 |
| 2,818,133 | Rosenthal | Dec. 31, 1957 |
| 2,841,005 | Coggeshall | July 1, 1958 |
| 2,891,630 | Hall et al. | June 23, 1959 |